Figure 1:
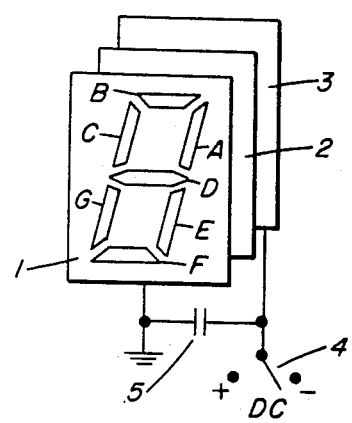

United States Patent [19]
Giglia

[11] 4,099,839
[45] Jul. 11, 1978

[54] FASTER ADDRESSING OF ELECTROCHROMIC DISPLAYS

[75] Inventor: Robert Domenico Giglia, Rye, N.Y.

[73] Assignee: American Cyanamid Company, Stamford, Conn.

[21] Appl. No.: 726,026

[22] Filed: Sep. 23, 1976

Related U.S. Application Data

[63] Continuation-in-part of Ser. No. 597,111, Jul. 18, 1975, abandoned, which is a continuation-in-part of Ser. No. 409,830, Oct. 26, 1973, abandoned.

[51] Int. Cl.² ............................................. G02F 1/36
[52] U.S. Cl. .................................................... 350/357
[58] Field of Search .................................... 350/160 R

[56] References Cited
U.S. PATENT DOCUMENTS

| | | | |
|---|---|---|---|
| 2,972,692 | 2/1961 | Thornton | 315/169 TV |
| 3,521,941 | 7/1970 | Deb et al. | 350/160 R |
| 3,626,244 | 12/1971 | Holz | 315/169 R |

*Primary Examiner*—William L. Sikes
*Attorney, Agent, or Firm*—Robert J. Feltovic; Bruce F. Jacobs

[57] ABSTRACT

Disclosed is an electrochromic data display and imaging device which may be formed by sandwich arrangement of an imaging area and a counter-electrode area with a suitable ion-conducting layer between, having a line of a plurality of alpha-numeric characters, and circuit means for improving the addressing speed of the device.

3 Claims, 2 Drawing Figures

FASTER ADDRESSING OF ELECTROCHROMIC DISPLAYS

This is a continuation-in-part of application Ser. No. 597,111, filed July 18, 1975, which in turn is a continuation-in-part of application Ser. No. 409,830 filed Oct. 26, 1973, both applications now abandoned.

This invention relates to electro-optical devices whose electromagnetic radiation absorption characteristics can be selectively altered by influence of a suitable controlled electric field. More particularly, the invention is concerned with an electro-optical device which has a faster addressing speed. Still more particularly, this invention is directed to a sandwich type cell in which two layers of electrochromic material are separated by solid, semi-solid or liquid ion conducting media, having at least one line of alpha-numeric characters.

In commonly assigned, copending U.S. application Ser. No. 41,154, filed May 25, 1970, abandoned and refiled as Ser. No. 609,251, Apr. 13, 1972, abandoned and refiled as 676,601, Apr. 13, 1976 and U.S. Pat. Nos. 3,521,941, 3,578,843, 3,704,057, 3,708,220 and 3,879,108, there are described electro-optical devices exhibiting a phenomenon known as persistent electrochromism wherein electromagnetic radiation absorption characteristic of a persistent electrochromic material is altered under the influence of an electric field. The cited patents describe suitable materials and methods for forming the basic electrochromic structure of the present invention. The structure preferably is formed in a sandwich arrangement of a substrate, an electrochromic material, an ion-conducting medium and a counter-electrode. The light transmitting substrate includes a coating of a conductive material, such as tin oxide. This substrate may be conveniently provided as a unit by commercially available NESA glass, which is a product having a transparent coating of tin oxide on one surface of a glass sheet. The electrochromic material may be deposited on the tin oxide layer by known vacuum deposition techniques. Coloration is induced by charging the electrochromic film negative with respect to the counter-electrode, employing an external potential. The counter-electrode can be the same as the persistent electrochromic material or different.

By reversing the original polarity of the field or by applying a new field, it is also possible to cancel, erase or bleach the visible coloration.

These steps of color induction and erasure are defined as cycling.

Although the devices described in the prior applications are effective to change their electromagnetic radiation transmitting properties under the influence of an electric field, the practicality of a simple sandwiched or layered arrangement of electrodes and a layer of electrochromic material is somewhat limited due to the fact that prior devices were either simple area displays or devices with separate characters and did not have high speed addressing capability.

This shortcoming has been overcome in the present invention by employing a novel circuit means for addressing an electrochromic display.

Conventional direct individual addressing of EC elements requires too long time periods for multi-element applications. The invention overcomes this disadvantage and permits the application of EC displays in uses not previously considered practical because of the time factor.

Prior electrochromic display elements require approximately 100 ms to address and color individually. However, by connecting a charge-sustaining capacitor across the EC element the combination may be addressed in 10 ms or less. The capacitor serves to supply power to each sequentially addressed EC element while other element circuits are being addressed. Thus, a series of ten numerics may be addressed sequentially in 100 ms total and the total display may come on in 200 ms total time from start to finish $$\left( \frac{10 \text{ ms address time}}{\text{element}} \times 10 \text{ elements} + 100 \text{ ms} \begin{array}{l} \text{total turn on} \\ \text{time for the} \\ \text{tenth element} \end{array} \right).$$

Without the use of the charge-sustaining capacitors, the total address time for 10 elements would be about 1000 ms (100 ms address time/element × 10 elements).

Figure 2:
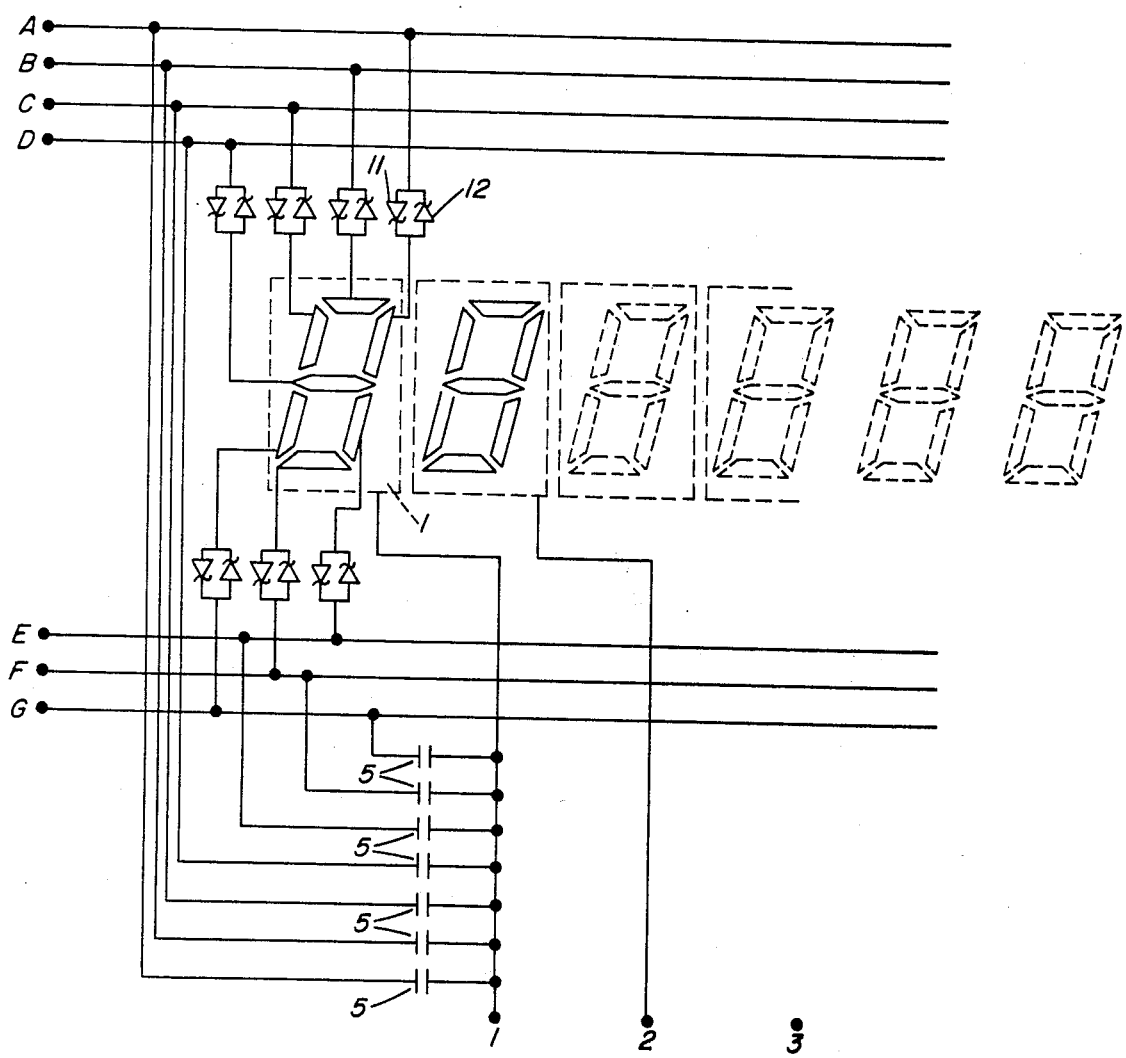

The invention may be further understood by reference to the Figures in which,

FIG. 1 is an exploded view of a single electrochromic numeric display according to the invention, FIG. 2 is a systematic representation of a line of numeric display elements and means for addressing.

Referring to FIG. 1 a single digit numeric display consists of an image area 1 of a transparent or translucent substrate, e.g. glass, with a transparent conductive deposit on its inner surface, such as tin oxide over areas A, B, C, D, E, F, and G and a deposit of an electrochromic layer such as tungsten oxide material on the inner surface of the tin oxide to form seven separate segments. The tin oxide layer is interrupted to form seven separate circuits for the segments. An ion conductive layer 2 is sandwiched between the display area 1 and a counter electrode 3.

A D.C. potential is applied through switch 4 to a parallel arrangement of an EC segment and a suitably sized capacitor 5. The capacitor is charged in one sense and the external potential is removed. The capacitor then discharges through the EC display, coloring the display. The display is erased by applying a reversed D.C. potential and charging the capacitor in the opposite sense. The capacitor then serves to erase the EC display after the external potential is removed. Of course, some coloring or erasing of the EC display results during the relatively short time addressing pulse but the effect is completed by the action of the capacitor over the relatively longer switching time required for the EC display. One capacitor per EC segment is necessary.

To further illustrate the invention, the following example is shown in FIG. 1. The individual segment circuits of a 5mm high EC numeric are connected together so that all segments are colored or erased when D.C. voltage of the appropriate polarity is applied. For simplicity of illustration, only the capacitor to the "F" segment is shown, and this is connected to the counter electrode 3 which is common to all display segments. A 200 μf capacitor is connected as shown across the device terminal circuits. In a case in which the applied potential was in the range 1.0 to 1.25 v a switching pulse time of 10 milliseconds (ms) resulted in a readable 35% contrast ratio or complete erasure depending upon polarity used. A similar test on the same EC display with capacitor removed necessitated switching pulse times between 100 ms and 200 ms to achieve 35% contrast and complete erasures.

The invention is particularly useful in applications which normally employ multiplexing methods or addressing or in simple calculator displays where sequential addressing of elements is the practical method. A schematic example of a multidigit single line calculator display is shown in FIG. 2. In the case of 10 digits there are 70 EC element circuits and 10 counter-electrode element circuits but only 17 terminals are required to interface with the addressing unit. The total refresh time, to erase and rewrite in this configuration is less than 400 ms with present design EC elements. Such configurations may employ two common diodes 11 and 12 per EC element as shown and may be part of an integrated circuit or as separate semi-conductors. Other configurations are possible e.g. the common diodes are replaced by Zener diodes or transistors, not shown. In applications which require relatively few EC elements and direct connection to all EC elements is practical (no need for multiplexing), the semi-conductors are not necessary for the faster addressing and may be eliminated.

In the circuit as shown in FIG. 2, lines "A" through "G" are switched simultaneously, while lines 1, 2, 3, etc. are switched sequentially. The digit type shown is well known in the art, and the numeral "3" could be formed by activating segments, B, A, D, E and F, by connecting the corresponding switches simultaneously with line 1. This provides a pulse stored by the appropriate capacitors. As previously described, in sequence, each digit is given a 10 ms addressing pulse which would allow ten digits in a line to be pulsed in 100 ms. The pulse current is stored in the capacitors and releases to color the digits. Since each digit would require 100 to 200 ms if addressed and colored without the capacitors. This would require from 1000 to 2000 ms for ten digits. By addressing each digit for 10 ms only, and passing on to the next, the total time for ten digits is 10 times 10 plus turn on time for the last digit or 200 to 300 ms. This will appear to be nearly instantaneous to the eye.

It will be obvious that more than one line of digits may be used in a composite display. Moreover, other types of well known alpha-numeric displays may be used so that both letters and numerals may be displayed.

The present display system is useful for numerous types of displays such as in an electronic calculator, with appropriate calculator logic circuitry.

Other alpha-numeric applications are in watch and clock faces, automobile dashboard displays, telephone displays, aircraft instrument panels, instrument displays, large sign or panel displays- indoor and outdoor, radio or television chanel displays, sports score boards, cash register displays, transportation arrival and departure displays, scales, gasoline pump indicators, public utility meters, taximeters, elevator annunciators, market quotation systems, and the like.

I claim:

1. In an electro-optical display device which contains a plurality of elements, each of said elements comprising a light transmitting substrate with a persistent electrochromic material as a light modulating material, a counter-electrode, and an ion conductive material in contact with said electrochromic material and said counter-electrode, an improved method to sequentially address each element comprising:
    1. providing means for a pulse of direct current, and
    2. one capacitor per element with said capacitor being in parallel connection with said element and the counter-electrode to transfer said pulse to the element for a fixed limited time interval, wherein the transfer interval is sufficiently long so as to accomplish writing or erasing of said element and the transfer interval occurs independently of the addressing.

2. A device as in claim 1, comprising a plurality of alpha-numeric elements, addressing means to address each element sequentially with a D.C. pulse current, and means to provide said current to each element for a time after the addressing of each said element.

3. The device of claim 2, wherein said addressing means includes capacitive means for each said element.

* * * * *